(12) United States Patent
Vigna et al.

(10) Patent No.: US 9,548,613 B2
(45) Date of Patent: Jan. 17, 2017

(54) MAINTAIN POWER SIGNATURE (MPS) FROM A POWERED DEVICE (PD) WHILE POWER IS DRAWN FROM ANOTHER SOURCE

(71) Applicant: Maxim Integrated Products, Inc., San Jose, CA (US)

(72) Inventors: Andrea Vigna, Casanova Lonati (IT); Mauro Ranzato, Torre D'Isola (IT); Gianluca Mariano, San Martino Siccomario (IT); Gaoling Zou, San Jose, CA (US); Thong A. Huynh, Fremont, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 606 days.

(21) Appl. No.: 14/028,604

(22) Filed: Sep. 17, 2013

(65) Prior Publication Data

US 2014/0084681 A1 Mar. 27, 2014

Related U.S. Application Data

(60) Provisional application No. 61/706,215, filed on Sep. 27, 2012, provisional application No. 61/782,090, filed on Mar. 14, 2013.

(51) Int. Cl.
| | |
|---|---|
| *H02J 1/08* | (2006.01) |
| *H02J 3/00* | (2006.01) |
| *H02J 4/00* | (2006.01) |
| *G06F 1/26* | (2006.01) |
| *H04L 12/10* | (2006.01) |

(52) U.S. Cl.
CPC . *H02J 4/00* (2013.01); *G06F 1/26* (2013.01); *H04L 12/10* (2013.01); *Y10T 307/258* (2015.04)

(58) Field of Classification Search
CPC ............ H04L 12/10; G06F 1/26; G06F 11/00; G06F 12/00; G06F 11/30; G01R 27/08; H02M 3/335
USPC ................ 307/12, 1, 80, 66, 64, 39, 43, 82; 363/21.01, 15; 340/310.11, 652; 324/705, 324/691; 379/24; 713/300, 310, 340
See application file for complete search history.

(56) References Cited

U.S. PATENT DOCUMENTS

| | | | |
|---|---|---|---|
| 7,863,871 B2* | 1/2011 | Vorenkamp | G06F 1/266 307/85 |
| 8,868,946 B2* | 10/2014 | Buhari | G06F 1/266 713/320 |

(Continued)

*Primary Examiner* — Rexford Barnie
*Assistant Examiner* — Jagdeep Dhillon
(74) *Attorney, Agent, or Firm* — Advent LLP

(57) ABSTRACT

A system for sinking maintain power signature (MPS) current to a rectifier bridge from a powered device (PD) controller in a Power over Ethernet (PoE) network is disclosed. In one or more implementations, the system includes a rectifier bridge configured to electrically connect to Power over Ethernet power sourcing equipment for receiving power from the power sourcing equipment. The system also includes a powered device controller operatively connected to the rectifier bridge and configured to control power supplied to a load. The load is configured to receive power from the power sourcing equipment and a second power source. The powered device controller is configured to source maintain power signature current to the power sourcing equipment using an input of the rectifier bridge when the second power source is furnishing power to the load.

20 Claims, 3 Drawing Sheets

(56) References Cited

U.S. PATENT DOCUMENTS

Figure 1:
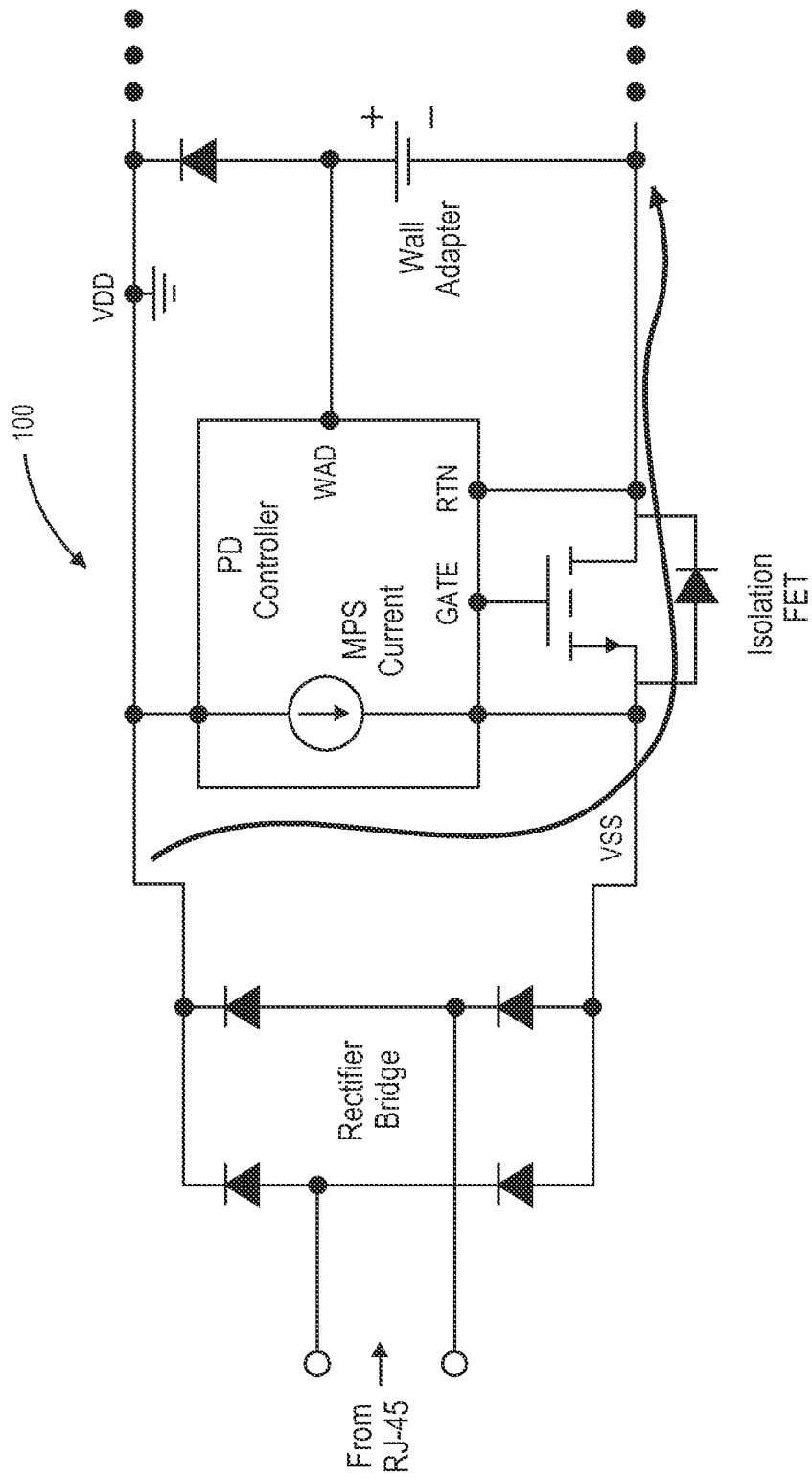

| | | | |
|---|---|---|---|
| 2006/0019629 A1* | 1/2006 | Berson | H04M 19/08 455/402 |
| 2006/0078093 A1* | 4/2006 | Karam | H04L 1/22 379/24 |
| 2006/0092000 A1* | 5/2006 | Karam | H04L 12/10 713/300 |
| 2006/0218422 A1* | 9/2006 | Camagna | H04L 12/10 713/300 |
| 2007/0208961 A1* | 9/2007 | Ghoshal | G06F 1/189 713/300 |
| 2007/0260904 A1* | 11/2007 | Camagna | H04L 12/10 713/310 |
| 2008/0291039 A1* | 11/2008 | Picard | G01R 31/021 340/652 |
| 2009/0168462 A1* | 7/2009 | Schopfer | H02M 3/33523 363/21.01 |
| 2009/0265563 A1* | 10/2009 | Camagna | G06F 1/266 713/300 |
| 2011/0125341 A1* | 5/2011 | Heath | H02J 1/108 700/295 |

* cited by examiner

MAINTAIN POWER SIGNATURE (MPS) FROM A POWERED DEVICE (PD) WHILE POWER IS DRAWN FROM ANOTHER SOURCE

CROSS-REFERENCE TO RELATED APPLICATIONS

The present application claims the benefit under 35 U.S.C. §119(e) of U.S. Provisional Application Ser. No. 61/706,215, entitled Maintain Power Signature (MPS) From a Powered Device (PD) While Power Is Drawn From Another Source, filed on Sep. 27, 2012 and U.S. Provisional Application Ser. No. 61/782,090, entitled Maintain Power Signature (MPS) From a Powered Device (PD) While Power Is Drawn From Another Source, filed on Mar. 14, 2013. U.S. Provisional Application Ser. Nos. 61/706,215 and 61/782,090 herein incorporated by reference in its entirety.

BACKGROUND

Power over Ethernet (PoE) technology describes passing electrical power, along with data, on Ethernet cabling. PoE technology is typically regulated by multiple IEEE standards. Power is supplied in common mode over two or more of the differential pairs of wires found in the Ethernet cables and comes from a power supply within a PoE-enabled networking device, such as an Ethernet switch, or can be injected into a cable run with a midspan power supply. The basic elements of a PoE system are: 1) power sourcing equipment (PSE), a device such as a switch that provides ("sources") power on the Ethernet cable, and 2) a powered device powered by a PSE that consumes energy from the PSE. Examples of powered devices include wireless access points, Internet protocol (IP) telephones, and IP cameras.

SUMMARY

A system for sinking maintain power signature (MPS) current to a rectifier bridge from a powered device (PD) controller in a Power over Ethernet (PoE) network is disclosed. In one or more implementations, the system includes a rectifier bridge configured to electrically connect to Power over Ethernet power sourcing equipment for receiving power from the power sourcing equipment. The system also includes a powered device controller operatively connected to the rectifier bridge and configured to control power supplied to a load. The load is configured to receive power from the power sourcing equipment and a second power source. The powered device controller is configured to source maintain power signature current to the power sourcing equipment using an input of the rectifier bridge when the second power source is furnishing power to the load.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

FIG. 1 is a diagrammatic illustration of a powered device controller connected to power sourcing equipment, where a maintain power signature (MPS) is implemented by sourcing current pulses to the power sourcing equipment using the controller ground.

Figure 2:
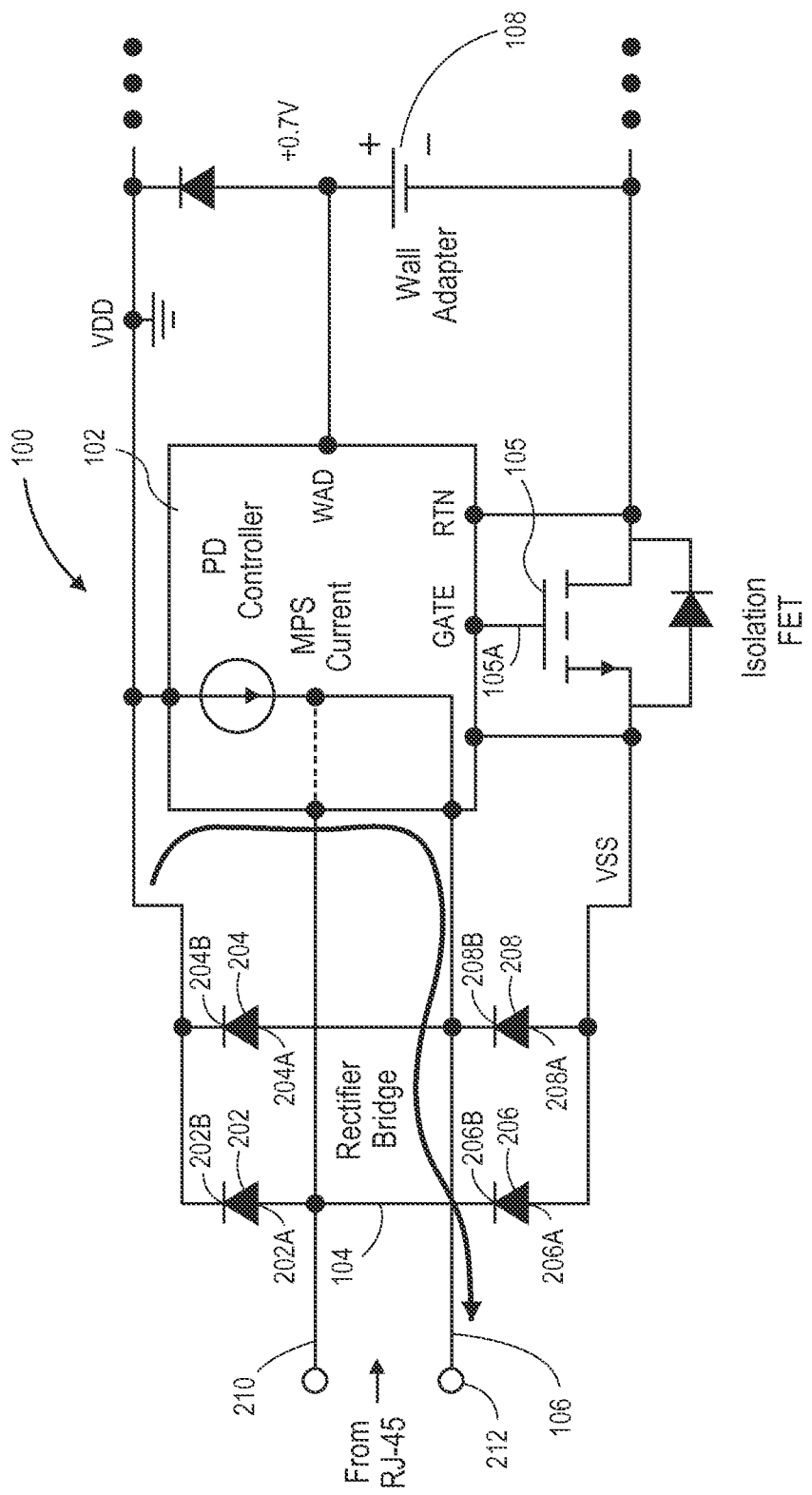

FIG. 2 is a diagrammatic illustration of a powered device controller connected to power sourcing equipment, where MPS is implemented by sourcing the maintain power signature current to the rectifier bridge when another power source is furnishing power to a load, and where the powered device controller is configured to furnish the maintain power signature current to the power sourcing equipment using an input of the rectifier bridge.

Figure 3:
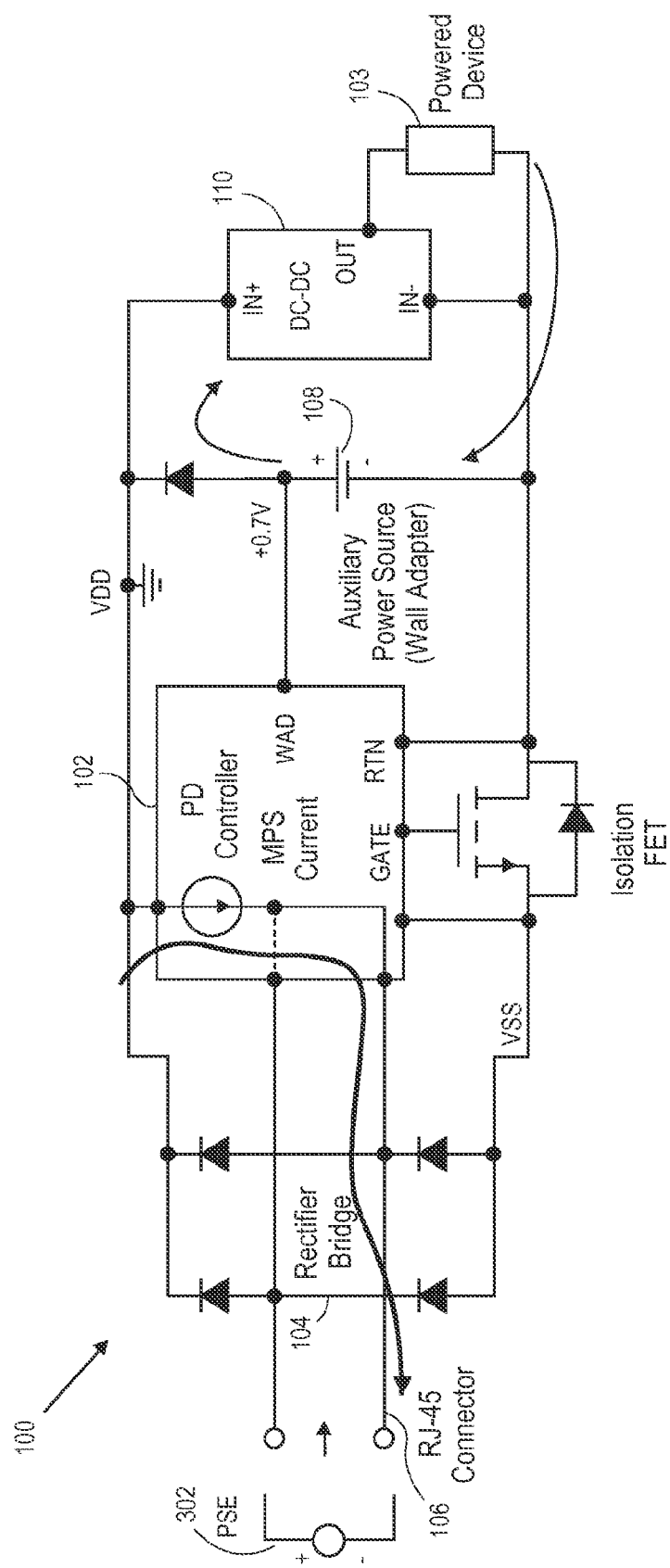

FIG. 3 is a diagrammatic illustration of a powered device controller connected to power sourcing equipment, where MPS is implemented by sourcing the maintain power signature current to the rectifier bridge when another power source is furnishing power to a load, and where the powered device controller is configured to furnish the maintain power signature current to the power sourcing equipment using an input of the rectifier bridge.

DETAILED DESCRIPTION

Overview

Power over Ethernet networks are configured to provide power, as well as data, to a powered device through Ethernet cables. Ethernet cables include modular connectors that interface with the powered devices, which furnish an electrical connection between the network and the powered devices.

In Power over Ethernet redundancy applications, a system using Power Sourcing Equipment (PSE) and a powered device controller may stop providing power to a load because another source (e.g., a wall adapter) having a higher voltage takes over. The second source could be a wall adapter or another PSE and powered device controller system connected in parallel with the first PSE and powered device controller system. The first system that was initially providing power to the load typically keeps the PSE active in order to be capable of resuming power delivery if the second source discontinues providing power to the load. In this manner, the PoE redundancy equipment can avoid power interruption to the load during the transition.

To maintain the PSE power at the RJ45 connector output, a maintain power signature (MPS) is typically implemented at the powered device controller side by sourcing current pulses to the PSE. Some powered device controllers provide MPS current to the PSE through the controller ground (e.g., as illustrated in FIG. 1). However, this method is not effective in the above scenario, e.g., where a second source with higher voltage takes over. The current pulses are sunk by the higher voltage source and may not flow to the PSE through the Ethernet cable, which causes the PSE to remove power.

Thus, systems for sinking maintain power signature (MPS) current to a rectifier bridge from a powered device controller in a Power over Ethernet network are disclosed. In one or more implementations, the system includes a rectifier bridge configured to electrically connect to Power over Ethernet power sourcing equipment for receiving power from the power sourcing equipment. The system also includes a powered device controller operatively connected to the rectifier bridge and configured to control power supplied to a load. The load is configured to receive power from the power sourcing equipment and a second power source. The powered device controller is configured to source maintain power signature current to the power sourcing equipment using an input of the rectifier bridge when the second power source is furnishing power to the load.

Example Implementations

Referring generally to FIG. 2, techniques and systems for sinking maintain power signature (MPS) current to a rectifier bridge from a powered device controller in a Power over Ethernet environment are described. In embodiments, a system 100 includes a powered device controller 102 coupled with power sourcing equipment 101 using a rectifier bridge 104. The system 100 is configured to deliver electrical power and data to a powered device via a PoE network. The PoE network can provide electrical power and data to the powered device 103 via an Ethernet cable having modular connecters (e.g., an 8 Position 8 Contact (8P8C) connector, or the like). The powered device 103 can comprise any powered device configured for use in a PoE network. Examples include, but are not necessarily limited to: a wireless access point, an Internet Protocol (IP) telephone, an IP camera, combinations thereof, and so forth.

As shown in FIGS. 1 through 3, in a specific implementation of the present disclosure, the system 100 includes an isolation field-effect transistor (FET) 105 to control current flow within the system 100. The powered device controller 102 controls operation of the isolation FET 105 such that the rectifier bridge 104 is either electrically connected to the wall adapter 108 or electrically isolated from the wall adapter 108. As shown, the powered device controller 102 is operatively connected to the gate 105A of the isolation FET 105. Thus, the powered device controller 102 is configured to control operation of isolation FET 105 by transitioning the isolation FET 105 between an open configuration (e.g., prevent current flow) and a closed configuration (e.g., allow current flow) based upon a mode of operation of the system 100. As shown, the isolation FET 105 is connected to the rectifier bridge 104 and to the wall adapter 108.

The rectifier bridge 104 can be used to shield the powered device controller 102 from reverse polarity. In an implementation, the rectifier bridge 104 may comprise a plurality of diodes 202, 204, 206, 208. As shown in FIGS. 1 through 3, the anode portion 202A of the diode 202 and the cathode portion 206B of the diode 206 is connected to a first input terminal 210, and the anode portion 204A of the diode 204 and the cathode portion 208B of the diode 208 is connected to a second input terminal 212. The input terminals 210, 212 (e.g., input 106) are configured to electrically connect to Power Sourcing Equipment (PSE) 302. The anode portions 206A, 208A are connected to the isolation FET 105

In embodiments, the powered device controller 102 sources out the MPS current (e.g., current pulses) to an input 106 of the rectifier bridge 104 (e.g., instead of the controller ground as illustrated in FIG. 2). In this manner, MPS can be maintained when a load is drawing power from another connected source having a higher voltage. The powered device controller 102 can thus maintain the PSE signature when necessary and provide seamless power transition for a load in a PoE redundancy system. As shown in FIG. 2, when a wall adapter 108 is connected at the output of the powered device controller 102 and has a higher voltage than the PSE voltage, MPS current is sourced through the input 106 of the rectifier bridge 104 (rather than the ground return VSS of the controller as shown in FIG. 1, where the current is sunk by the wall adapter instead of flowing to the PSE, resulting in power removal at the cable side).

In implementations, a current generator in the powered device controller 102 can source current to the bridge input connection that has a lower voltage (e.g., the lowest voltage), such as the input 106. In this manner, MPS current pulses are allowed to flow to the PSE in various scenarios, and the MPS current can be sunk by the output of the PSE even when the ground return of the powered device controller 102 is at a lower voltage with respect to the PSE output. Further, the bridge diodes 202, 204, 206, 208 can provide electrical isolation between the wall adapter 108 voltage and the PSE voltage. Thus, the PSE can maintain power at the cable side even when the wall adapter 108 has higher voltage.

In one embodiment and as illustrated by FIG. 3, system 100 may include a DC-DC converter 110. A DC-DC converter includes an electronic circuit which converts a source of direct current (DC) from one voltage level to another. In some implementations, the DC-DC converter 110 comprises a buck converter. In this embodiment, the PD controller 102 maintains the PoE power signature by generating and sending the PSE proper current pulses (a minimum level of 10 mA is required by the standard to keep the PSE connected). The system 100 takes advantage of the presence of a rectifier bridge 104 at the PD side, which is used to protect from reverse polarity. The MPS current pulses are sent to the PSE through the bridge inputs, as shown in FIG. 3, while the load draws power from the wall adapter 108. The current generator implemented in the PD controller is referred to the VDD connection, and it sources current to the bridge input connection which has lowest voltage between the two inputs. The MPS current pulses can be sunk by the output of the PSE even if the ground return of the PD controller is at a lower voltage with respect to the output of the PSE. The bridge diodes 202, 204, 206, 208 provide the necessary electrical isolation between the adapter voltage and the PSE voltage. Other solutions fail to address the problem because the MPS current pulses are sourced to the PSE through the ground return VSS of the PD controller. When the wall adapter voltage is higher than the PSE voltage, the current pulses are sunk by the adapter. This results in a PSE power removal at the cable side. System 100 overcomes limitations of other solutions by sending the MPS current pulses through the inputs of the rectifier bridge.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A system comprising:
 a rectifier bridge configured to electrically connect to a power over Ethernet (PoE) power sourcing equipment (PSE) for receiving power from the PSE, the rectifier bridge comprising a first input terminal and a second input terminal; and
 a powered device controller operatively connected to the rectifier bridge and configured to control power supply to a load, the load configured to receive power from the PSE and a second power source, the powered device controller configured to source maintain power signature (MPS) current to the power sourcing equipment using at least one of the first input terminal or the second input terminal of the rectifier bridge when the second power source is furnishing power to the load and the power furnished by the second power source is greater than the power furnished by the PSE, wherein the rectifier bridge electrically isolates the first input terminal and the second input terminal from a ground return of the power sourcing equipment to prevent sourcing of the MPS current through the ground return.

2. The system of claim 1, wherein the rectifier bridge includes a plurality of diodes.

3. The system of claim 1, wherein the load comprises a powered device.

4. The system of claim 3, wherein the powered device comprises at least one of a wireless access point, an Internet Protocol (IP) telephone, or an IP camera.

5. The system of claim 1, wherein the load comprises a DC-DC converter configured to convert a source of direct current (DC) from a first voltage level to a second voltage level.

6. The system of claim 5, wherein the DC-DC converter is configured to furnish power to a powered device.

7. The system of claim 5, wherein the DC-DC converter includes a buck converter.

8. A system comprising:
a rectifier bridge configured to electrically connect to a power over Ethernet (PoE) power sourcing equipment (PSE) for receiving power from the PSE, the rectifier bridge comprising a plurality of diodes, the rectifier bridge electrically connected to a first terminal and a second terminal;
a powered device controller operatively connected to the rectifier bridge and configured to control power supply to a load, the load configured to receive power from the PSE and a second power source, the powered device controller configured to source maintain power signature (MPS) current to the power sourcing equipment using at least one of the first terminal or the second terminal of the rectifier bridge when the second power source is furnishing power to the load, wherein the rectifier bridge electrically isolates the first input terminal and the second input terminal from a ground return of the power sourcing equipment to prevent sourcing of the MPS current through the ground return; and
an isolation field-effect transistor communicatively coupled to the second power source and the rectifier bridge along the ground return of the powered device controller, the isolation field-effect transistor operatively coupled to the powered device controller.

9. The system of claim 8, wherein an anode portion of a first diode of the plurality of diodes and a cathode portion of a second diode of the plurality of diodes is connected to the first terminal and an anode portion of a third diode of the plurality of diodes and a cathode portion of a fourth diode of the plurality of diodes is connected to the second terminal.

10. The system of claim 8, wherein the load comprises a powered device.

11. The system of claim 10, wherein the powered device comprises at least one of a wireless access point, an Internet Protocol (IP) telephone, or an IP camera.

12. The system of claim 8, wherein the load comprises a DC-DC converter configured to convert a source of direct current (DC) from a first voltage level to a second voltage level.

13. The system of claim 12, wherein the DC-DC converter is configured to furnish power to a powered device.

14. The system of claim 12, wherein the DC-DC converter includes a buck converter.

15. The system of claim 8, wherein the first terminal and the second terminal is configured to interface with power sourcing equipment.

16. A system comprising:
a rectifier bridge configured to electrically connect to a power over Ethernet (PoE) power sourcing equipment (PSE) for receiving power from the PSE, the rectifier bridge comprising a plurality of diodes, the rectifier bridge electrically connected to a first terminal and a second terminal;
a powered device controller operatively connected to the rectifier bridge and configured to control power supply to a load, the load configured to receive power from the PSE and a second power source, the powered device controller configured to source maintain power signature (MPS) current to the power sourcing equipment using at least one of the first terminal or the second terminal of the rectifier bridge when the second power source is furnishing power to the load, wherein the rectifier bridge electrically isolates the first input terminal and the second input terminal from a ground return of the power sourcing equipment; and
an isolation field-effect transistor communicatively coupled to the second power source and the rectifier bridge along the ground return of the powered device controller, the isolation field-effect transistor operatively coupled to the powered device controller,
wherein an anode portion of a first diode of the plurality of diodes and a cathode portion of a second diode of the plurality of diodes is connected to the first terminal and an anode portion of a third diode of the plurality of diodes and a cathode portion of a fourth diode of the plurality of diodes is connected to the second terminal, wherein an anode portion of the second diode and an anode portion of the fourth diode is communicatively coupled to the isolation field-effect transistor.

17. The system of claim 16, wherein an anode portion of a first diode of the plurality of diodes and a cathode portion of a second diode of the plurality of diodes is connected to the first terminal and an anode portion of a third diode of the plurality of diodes and a cathode portion of a fourth diode of the plurality of diodes is connected to the second terminal.

18. The system of claim 16, wherein the load comprises a powered device.

19. The system of claim 18, wherein the powered device comprises at least one of a wireless access point, an Internet Protocol (IP) telephone, or an IP camera.

20. The system of claim 16, wherein the load comprises a DC-DC converter configured to convert a source of direct current (DC) from a first voltage level to a second voltage level.

* * * * *